United States Patent [19]

Katsuhiko

[11] Patent Number: 5,531,069
[45] Date of Patent: Jul. 2, 1996

[54] CATALYST DETERIORATION-DETERMINING DEVICE OF AN INTERNAL COMBUSTION ENGINE

[75] Inventor: Toyoda Katsuhiko, Shizuoka-ken, Japan

[73] Assignee: Suzuki Motor Corporation, Shizuoka-ken, Japan

[21] Appl. No.: 361,433

[22] Filed: Dec. 21, 1994

[30] Foreign Application Priority Data

Jan. 31, 1994 [JP] Japan .................................. 6-027297

[51] Int. Cl.$^6$ ........................................................ F01N 3/20
[52] U.S. Cl. .............................................. 60/276; 60/277
[58] Field of Search .............................. 60/274, 276, 277

[56] References Cited

U.S. PATENT DOCUMENTS 5,325,664  7/1994  Seki .......................................... 60/277
5,363,647  11/1994  Ohuchi ...................................... 60/276

FOREIGN PATENT DOCUMENTS

0478133A2  4/1992  European Pat. Off. .
4-116239   4/1992  Japan .
4-109045   4/1992  Japan .

*Primary Examiner*—Douglas Hart
*Attorney, Agent, or Firm*—Flynn, Thiel, Boutell & Tanis

[57] ABSTRACT

A catalyst deterioration-determining device for an internal combustion engine, in which a temperature sensor for detecting the temperature of a catalyst body is eliminated, but high-precision determination can be made to the deterioration of the catalyst body. To this end, a control unit determines, on the basis of a warm-up counter used for a catalyst body, whether or not the catalyst body is in a predetermined warm-up state. The warm-up counter reckons in relation to any engine load of an internal combustion engine. If the catalyst body is found to be in the predetermined warm-up state according to the above determination, the control unit determines whether or not deterioration-determining conditions for the catalyst body have been fulfilled.

2 Claims, 7 Drawing Sheets

FIG. 4
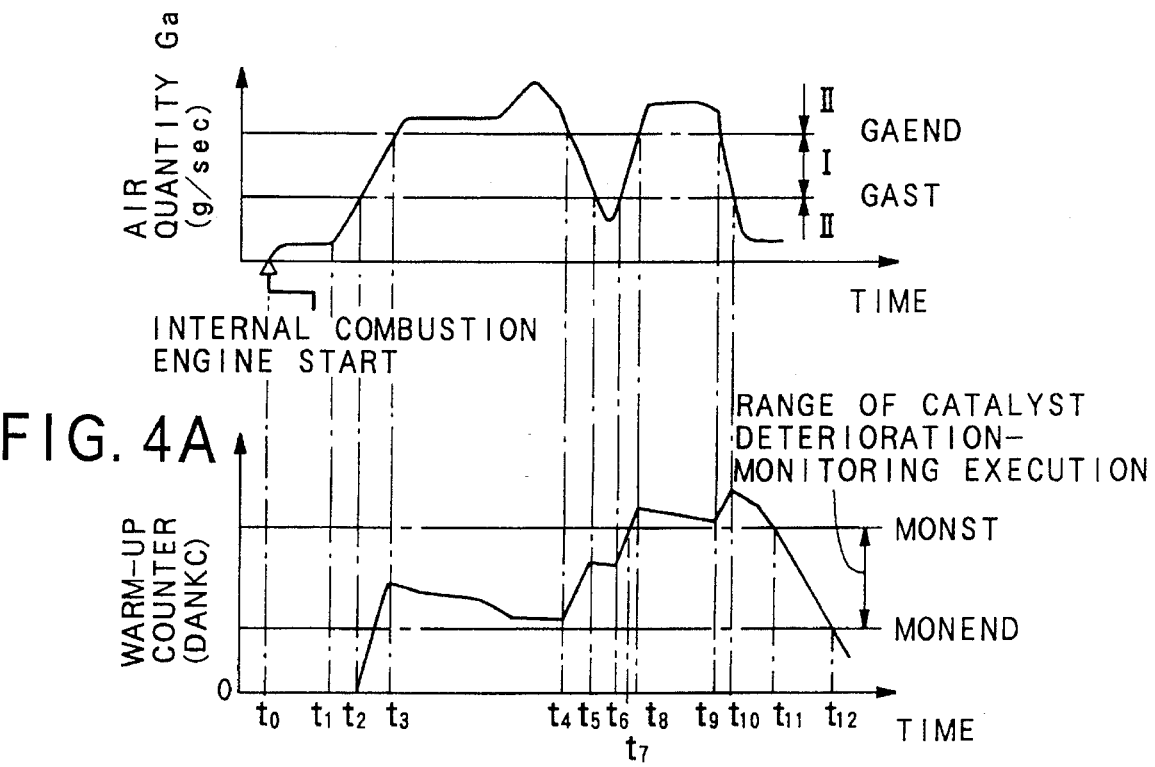
FIG. 4A
FIG. 5
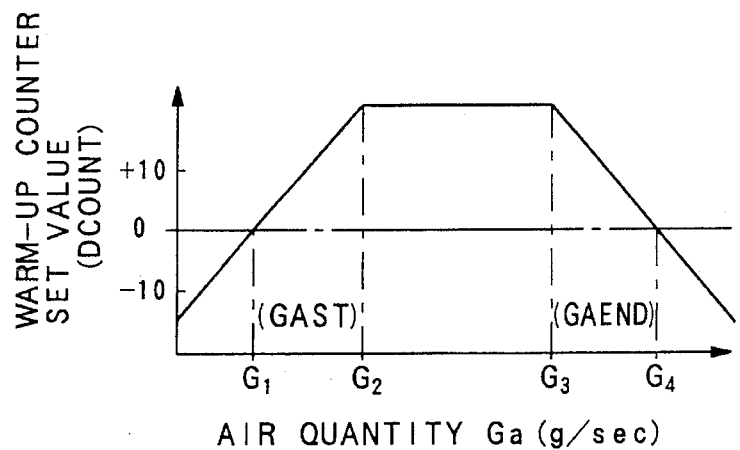

CATALYST DETERIORATION-DETERMINING DEVICE OF AN INTERNAL COMBUSTION ENGINE

FIELD OF THE INVENTION

This invention relates to a catalyst deterioration-determining device for an internal combustion engine. More particularly, it relates to an improved catalyst deterioration-determining device for an internal combustion engine, in which a temperature sensor for detecting the temperature of a catalyst body is eliminated, but high-precision determination can be made to the deterioration of the catalyst body.

BACKGROUND OF THE INVENTION

In vehicles, a catalyst body is provided midway along an exhaust passage in an exhaust system in order to purify exhaust emissions which are discharged from an internal combustion engine. Among such constructions having the catalyst body placed in the exhaust system, there is one type of structure which is provided with a catalyst deterioration-determining device.

Some of the catalyst deterioration-determining devices are constructed to provide what is called dual feedback control. More specifically, this type of catalyst deterioration-determining device has front and rear oxygen sensors disposed in an exhaust passage of an internal combustion engine respectively on upstream and downstream sides of a catalyst body. The catalyst body is placed midway along the exhaust passage. The front oxygen sensor acts as a first exhaust sensor, while the rear oxygen sensor serves as a second exhaust sensor. The catalyst deterioration-determining device executes feedback control of an air-fuel ratio in accordance with respective detection signals from the front and rear oxygen sensors. At the same time, this device determines the deterioration of the catalyst body when predetermined catalyst deterioration-determining conditions are fulfilled. To be specific, the catalyst deterioration-determining device performs first feedback control of the air-fuel ratio to a target value on the basis of a first feedback control value. The first feedback control value is calculated from a first detection signal that is generated from the front oxygen sensor. The device further executes second feedback control in which a degraded state of the catalyst body is judged by a second feedback control value, thereby correcting the first feedback control value. The second feedback control value is derived from a second detection signal that is generated from the rear oxygen sensor.

The preceding devices for determining the catalyst deterioration are disclosed, e.g., in published Japanese Patent Applications Laid-Open Nos. 4-109045 and 4-116239.

According to above-mentioned Publication No. 4-109045, the catalyst deterioration-determining device includes: a purifying means located in an exhaust pipe of an internal combustion engine; air-fuel ratio-detecting means disposed individually on upstream and downstream sides of the purifying means; a fuel-supplying means for supplying fuel to cylinders of the internal combustion engine; and, an electronic control means for controlling the fuel-supplying means upon receiving respective detection signals from the air-fuel ratio-detecting means. As a result of this construction, an air-fuel ratio of a mixture to be supplied to the cylinders is controlled on the basis of the detection signal from one of the air-fuel ratio-detecting means, which is located on the upstream side of the purifying means. In addition, the detection signal from the other of the air-fuel ratio-detecting means, which is positioned on the downstream side of the purifying means, responds differently to different target values of the air-fuel ratio. Accordingly, the deterioration of the purifying means is monitored by such different responses of the detection signal. As a result, determination with increased reliability can be made in shorter time as to whether the catalyst has been degraded.

According to the device of aforementioned Publication No. 4-116239, air-fuel ratio sensors are disposed individually on upstream and downstream sides of a catalytic converter, and comparison is made between respective output signals from the air-fuel ratio sensors, thereby determining the catalyst deterioration. At this time, however, if it is found that learning correction using the aforementioned downstream side sensor has insufficiently been renewed, this catalyst deterioration-determining device prohibits further diagnosis of the learning correction. This feature prevents both reduced accuracy of diagnosis and inconsistent criteria of judgment, each of which would occur as a result of an actual air-fuel ratio itself being deviated.

In the preceding devices for determining the catalyst deterioration, there is nothing to materially diminish the function of the catalyst body so far as vehicles which are in normal use.

However, the function of the catalyst body is dramatically reduced when, e.g., a vehicle user operates a vehicle with lead-containing fuel, or when a vehicle is traveled in a state of a high-tension cord being pulled out of position as a result of unexpected causes. The reduced function of the catalyst body reduces exhaust emission-purifying efficiency. This causes an inconvenience in that there is an increased possibility of exhaust steam being released in the air, which results in environmental aggravation.

In addition, a temperature state of the catalyst body is detected by a temperature sensor, and a warm-up state (an activated temperature state) and an oxygen storage state (an oxygen-retaining state) of the catalyst body is judged by the detected temperature state which is indicated by a detection signal from the temperature sensor. In this way, this step requires the temperature sensor, which creates another inconvenience of a complicated, high cost structure.

Furthermore, with respect to execution conditions of determining (or, monitoring) the deterioration of the catalyst body, a problem occurs with a catalyst deterioration-determining device adapted to simulate and determine the deterioration of the catalyst body in accordance with the oxygen storage ability of the catalyst body. More specifically, there are cases where an oxygen storage capacity of the catalyst body is reduced, depending on the warm-up state (the activated temperature state) of the catalyst body. In particular, the oxygen storage capacity is decreased when the catalyst body is cooled down by being exposed to wind at low temperatures during vehicle traveling. The reduced oxygen storage capacity also occurs during long regimes of low load traveling, idle operation, or high load traveling. Thereafter, the oxygen storage capacity of the catalyst body remains diminished during lapse of some seconds up to some minutes. As a result of the reduced oxygen storage capacity, the catalyst body is determined to be abnormal in spite of being normal, thereby involving misjudgment on the deterioration of the catalyst body. This causes an inconvenience of requiring meaningless replacement or repair of parts.

In order to obviate the aforesaid inconveniences, a first aspect of the present invention provides a catalyst deterioration-determining device for an internal combustion engine, having first and second exhaust sensors disposed in an exhaust passage of the internal combustion engine respectively on upstream and downstream sides of a catalyst body, the catalyst body being placed midway along the exhaust passage, the catalyst deterioration-determining device effecting feedback control of an air-fuel ratio in response to respective detection signals from the first and second exhaust sensors, and simultaneously determining the deterioration of the catalyst body when predetermined catalyst deterioration-determining conditions are fulfilled, the improvement comprising: a control means which judges, on the basis of a warm-up counter used for the catalyst body, whether or not the catalyst body is in a predetermined warm-up state, the warm-up counter reckoning in relation to any engine load of the internal combustion engine, wherein assuming that the catalyst body is found to be in the predetermined warm-up state according to the above judgment, the control means determines whether or not deterioration-determining conditions for the catalyst body have been fulfilled.

A second aspect of the present invention provides a catalyst deterioration-determining device for an internal combustion engine according to the first aspect, wherein after the internal combustion engine is started, the control means drives the warm-up counter to state reckoning in relation to any engine load of the internal combustion engine, whereby the control means judges that the catalyst body is in a predetermined warm-up state when counts registered by the warm-up counter fall within a range of catalyst deterioration-determining execution, and wherein the control means determines the degradation of the catalyst body in the event that the catalyst body is known by the above judgment to be in the predetermined warm-up state, and that other catalyst deterioration-determining conditions are all satisfied.

According to the structure incorporating the present invention, there is provided the control means which determines, on the basis of the warm-up counter, whether or not the catalyst body is in a predetermined warm-up state. The warm-up counter is used for the catalyst body, and counts in relation to any engine load of the internal combustion engine. Assuming the catalyst body is found to be in the predetermined warm-up state according to the above determination, the control means judges whether or not deterioration-determined conditions for the catalyst body have been fulfilled. As a result, a warm-up state and an oxygen storage state of the catalyst body can be simulated and determined without the use of a temperature sensor. Accordingly, there is no need for the temperature sensor, and a simple, low cost structure is provided.

In addition, since a temperature state of the catalyst body known from the temperature sensor is ignored from the deterioration-determining conditions for the catalyst body, accurate determination can be made to the degradation of the catalyst body. Consequently, improvements are achievable in both the reliability of vehicles and the accuracy of judgment on the deterioration of the catalyst body.

Furthermore, when the temperature of the catalyst body under the influence of low temperatures and/or a strong wind is lowered to a level incapable of determining the deterioration of the catalyst body, the catalyst deterioration-determining conditions are identified as not being fulfilled in spite of the catalyst body being in normal operation. Therefore, determination is stopped from being made to the deterioration of the catalyst body. As a result, there is no likelihood that the catalyst body in a normal state might be judged as abnormal. This means that a misjudgment is not made as to the degradation of the catalyst body, thereby obviating the need for needless replacement or repair of parts.

BRIEF DESCRIPTION OF THE DRAWINGS

FIGS. 4 and 4A are graphs illustrating an air quantity and a warm-up counter;

FIG. 5 is a graph illustrating a warm-up counter set value;

DETAILED DESCRIPTION

Figure 1:
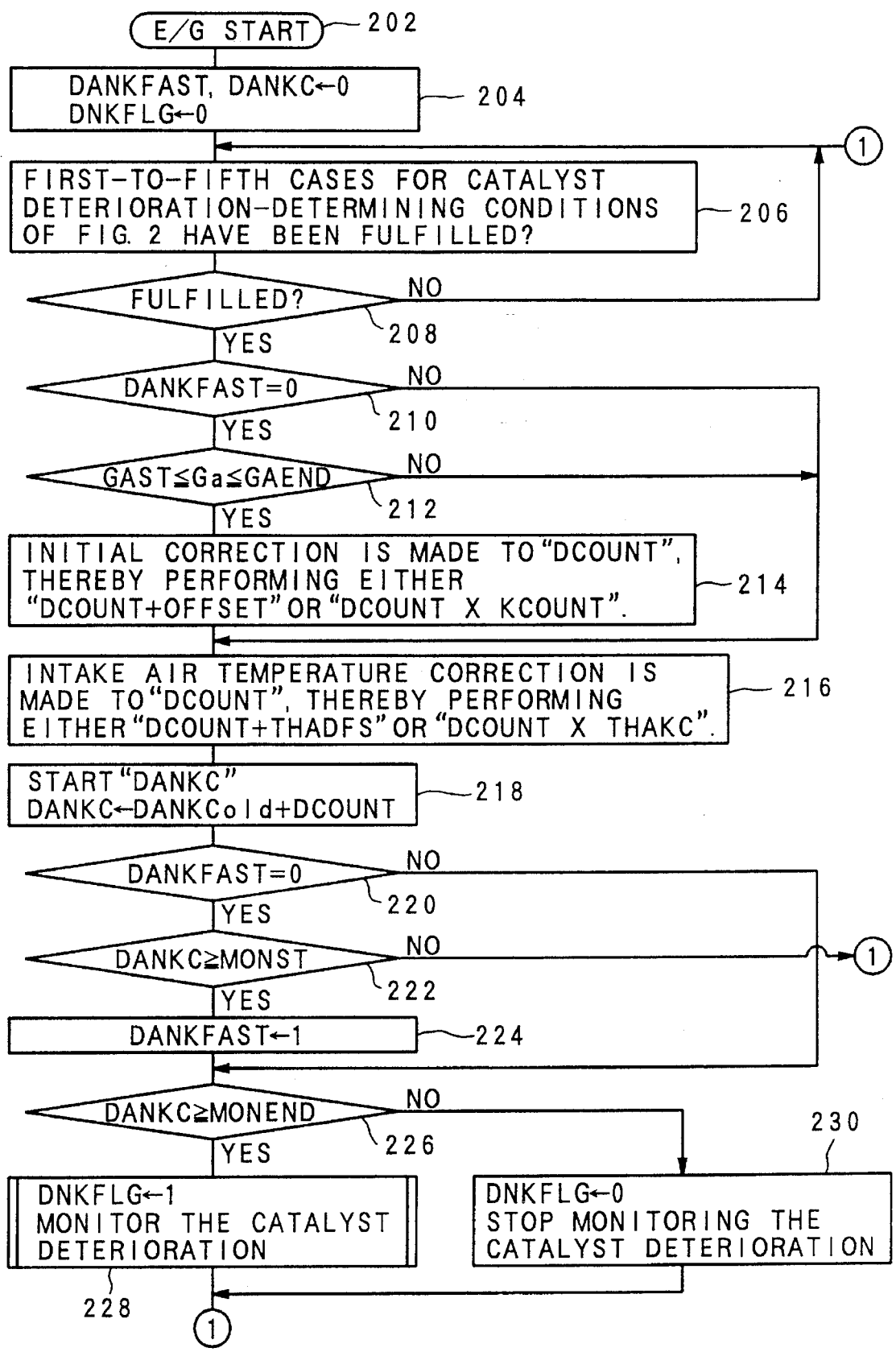
FIG. 1 is a flow chart describing the operation of determination as to catalyst deterioration.

Now, an embodiment of the present invention will be described in specific detail with reference to FIGS. 1–15. In FIG. 15, reference numeral 2 denotes an internal combustion engine of a fuel injection control type; 4 a catalyst deterioration-determining device; 6 a cylinder block; 8 a cylinder head; 10 a piston; 12 an air cleaner; 14 an intake pipe; 16 a throttle body; 18 an intake manifold; 20 an intake passage; 22 an exhaust pipe; and 24 an exhaust passage.

The intake pipe 14 is provided between the air cleaner 12 and the throttle body 16. The intake pipe 14 has a first intake passage 20-1 defined therein. An air flow meter 26 for measuring an inducted air quantity is placed on an upstream side of the intake pipe 14.

A resonator 28 for reducing inlet air-emitting sound is provided on an upstream side of the air cleaner 12. The throttle body 16 has a second intake passage 20-2 defined therein which communicates with the first intake passage 20-1. The second intake passage 20-2 has an intake air throttle valve 30 located therein. Further, the second intake passage 20-2 communicates with a third intake passage 20-3 via a surge tank 32. The third intake passage 20-3 is formed inside the intake manifold 18. A downstream side of the third intake passage 20-3 communicates with a combustion chamber 36 of the internal combustion engine 2 via an air intake valve 34. The combustion chamber 36 communicates with the exhaust passage 24 via an air exhaust valve 38.

The exhaust pipe 22 is provided with a front oxygen sensor 40 and a catalyst body 44. These components 40 and 44 are arranged in turn from the side of the internal combustion engine 2. The front oxygen sensor 40 is a first air-fuel ratio sensor which is provided with a heater. The catalyst body 44 forms a part of a catalytic converter 42. The front oxygen sensor 40 is located in the exhaust passage 24 on an upstream side of the catalyst body 44. The front oxygen sensor 40 detects a concentration of oxygen in exhaust emissions within the exhaust passage 24 on the upstream side of the catalyst body 44, and generates a detection signal in response thereto.

The exhaust pipe 22 is further provided with a rear oxygen sensor 46 on a downstream side of the catalyst body 44. The rear oxygen sensor 46 is a second air-fuel ratio sensor. The same sensor 46 detects a concentration of oxygen in exhaust gases within the exhaust passage 24 on the downstream side of the catalyst body 44, and generates a detection signal in response thereto.

A fuel injection valve 48 is operatively attached at a location where the intake manifold 18 and the cylinder head 8 are connected together. The fuel injection valve 48 is oriented toward the combustion chamber 36.

Fuel in a fuel tank 50 is fed under pressure to the fuel injection valve 48. More specifically, the fuel in the tank 50 is pumped under pressure into a fuel supply passage 54 by a fuel pump 52. The fuel is filtered through a fuel filter 56. The filtered fuel is fed into a fuel distribution pipe 58 in which pressure exerted on the fuel is adjusted to a given level by a fuel pressure regulator 60. Thereafter, the pressure-regulated fuel reaches the fuel injection valve 48.

There is an evaporating fuel passage 62 whose one end communicates with an upper portion inside of the fuel tank 50. The throttle body 16 has the other end of the evaporating fuel passage 62 in communication with the second intake passage 20-2. Further, a two-way valve 64 and a canister 66 are provided midway along the evaporating fuel passage 62. These two components 64 and 66 are positioned in sequence from the side of the fuel tank 50.

An idle bypass air passage 68 is provided for bypassing the intake air throttle valve 30, thereby intercommunicating the first intake passage 20-1 and the inside of the surge tank 32. An idle rotational speed control valve (an ISC valve) 70 is positioned midway along the idle bypass air passage 68. This valve 70 opens and closes the idle bypass air passage 68 in order to regulate an air quantity during idle operation.

Further, the throttle body 16 has an auxiliary bypass air passage 72 defined therein. The auxiliary bypass air passage 72 bypasses the intake air throttle valve 30. The passage 72 is opened and closed by an auxiliary bypass air quantity regulator 74.

An idle rotational speed controller 76 is formed by some of the preceding components: the idle bypass air passage 68; the idle rotational speed control valve 70; the auxiliary bypass air passage 72; and the auxiliary bypass air quantity regulator 74.

The idle rotational speed controller 76 actuates the idle rotational speed control valve 70, thereby feedback-controlling the idle rotational speed of the internal combustion engine 2 to a target idle rotational speed. Further, the idle rotational speed controller 76 regulates the target idle rotational speed by means of the auxiliary bypass air quantity regulator 74. The regulator 74 is located in the auxiliary bypass air passage 72 that bypasses the intake air throttle valve 30 in order to intercommunicate the first intake passage 20-1 and the inside of the surge tank 32.

An air passage 78 is located midway along the idle bypass air passage 68. The air passage 78 is branched off from the idle bypass air passage 68, and opens into the surge tank 32. The air passage 78 is provided with an air valve 80 which operates on engine cooling water temperature and the like. The air passage 78 and the air valve 80 form an air regulator 82.

Further, a power steering air passage 84 is positioned midway along the idle bypass air passage 68. The power steering air passage 84 is branched off from the idle bypass air passage 68, and is in communication with the inside of the surge tank 32. A power steering control valve 86 is provided midway along the power steering air passage 84. The power steering control valve 86 is operatively controlled by a power steering switch 88.

In order to cause blow-by gases, which are generated in the internal combustion engine 2, to flow back to an air suction system of the engine 2, the internal combustion engine 2 has first and second blow-by gas return passages 92 and 94 communicated with each other at the cylinder head 8. The first blow-by gas return passage 92 communicates with a PCV valve 90 which is mounted on the surge tank 32. The second blow-by gas return passage 94 opens into the first intake passage 20-1.

The intake pipe 14 is provided with a throttle sensor 96 and a dashpot 98. The throttle sensor 96 detects an opened state of the intake air throttle valve 30. The throttle sensor 96 also functions as an idle switch. The dashpot 98 prevents rapid closing of the intake air throttle valve 30.

An ignition coil 102 communicates with a power unit 100 and a distributor 106. The distributor 106 constitutes an ignition mechanism 104.

Further, the internal combustion engine 2 is provided with a crank angle sensor 108 which detects a crank angle of the engine 2. The crank angle sensor 108 also serves as an engine rotational speed sensor.

In addition, the cylinder block 6 of the internal combustion engine 2 is provided with a water temperature sensor 112 and a knocking sensor 114. The water temperature sensor 112 detects the temperature of engine cooling water inside a cooling water passage 110. The cooling water passage 110 is defined in the cylinder block 6. The knocking sensor 114 detects a knocking state of the internal combustion engine 2.

Among the preceding components, the following communicate with a control means (i.e., an engine control unit, or ECU) 116: the air flow meter 26; the front oxygen sensor 40; the rear oxygen sensor 46; the fuel injection valve 48; the fuel pump 52; the idle rotational speed control valve 70; the power steering control valve 86 and the power steering switch 88; the throttle sensor 96; the power unit 100; the crank angle sensor 108; the water temperature sensor 112; and the knocking sensor 114.

The control means 116 also communicates with: a vehicle velocity sensor 118; a diagnostic lamp 120; a diagnostic switch 122; a test switch 124; a battery 130 via a fuse 126 and a main switch 128; and a warning lamp 134 via an alarm relay 132. The alarm relay 132 communicates with, e.g., a thermosensor 136 which detects exhaust temperatures inside the exhaust passage 24 on the downstream side of the catalyst body 44.

The control means 116 receives various detection signals. The control means 116 effects feedback (F/B) control of an air-fuel ratio in accordance with the detection signals from the front and rear oxygen sensors 40 and 46. At the same time, the control means 116 determines the deterioration of the catalyst body 44 when predetermined catalyst deterioration-determining conditions are fulfilled.

To this end, the control means 116 includes a deterioration-determining section 138. This section 138 judges a deteriorated state of the catalyst body 44 when predetermined catalyst deterioration-determining (monitoring) conditions are met.

In order to simulate and judge a warm-up state (an activated temperature state) and an oxygen storage state (an oxygen-retaining state) of the catalyst body 44, the deterioration-determining section 138 is provided with a warm-up counter circuit 140 and a timer 142, both of which form a warm-up counter (DANKC) used for the catalyst body 44. The warm-up counter (DANKC) counts in relation to any engine load (e.g., an air quantity) of the internal combustion engine 2.

On the basis of the aforesaid warm-up counter (DANKC), the control means 116 judges whether or not the catalyst body 44 is in a predetermined warm-up state. Assuming that the catalyst body 44 is found to be in the predetermined warm-up state according to the above judgment, the control means 116 determines whether or not deterioration-determining conditions for the catalyst body 44 have been fulfilled. Further, after the internal combustion engine 2 is started, the control means 116 drives the warm-up counter (DANKC) to start reckoning in relation to any engine load of the internal combustion engine 2. When counts registered by the warm-up counter (DANKC) fall within a range of catalyst deterioration-determining execution, the control means 116 judges that the catalyst body 44 is in a predetermined warm-up state. The control means 116 determines the degradation of the catalyst body 44 in the event that the catalyst body 44 is known by the above judgment to be in the predetermined warm-up state, and that other catalyst deterioration-determining conditions are all satisfied.

Figure 2:
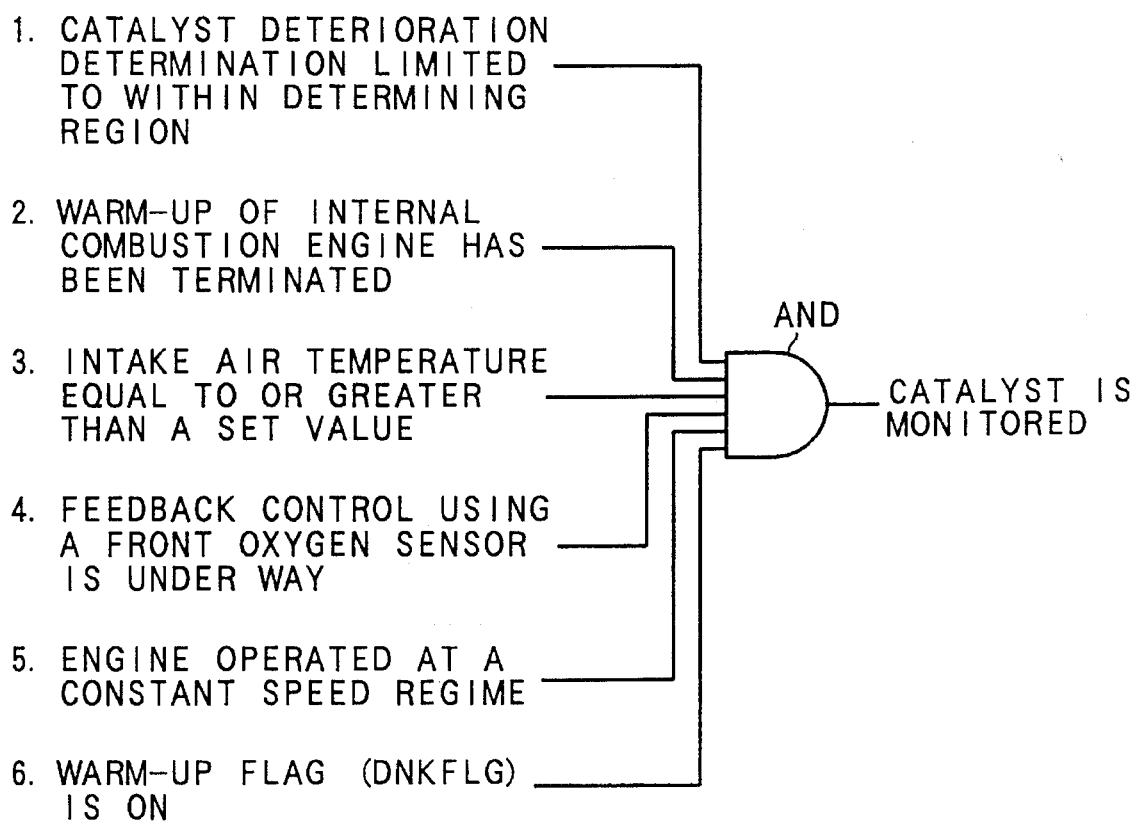
FIG. 2 is a descriptive illustration showing catalyst deterioration-determining conditions.

As illustrated in FIG. 2, the aforesaid catalyst deterioration-determining (or monitoring) conditions are fulfilled when meeting all of the following cases in which: determination as to catalyst deterioration is limited to within a catalyst deterioration-determining region that is defined by an engine rotational speed and an engine load (see FIG. 3 for the region); warm-up of the internal combustion engine 2 has been terminated; an intake air temperature is equal to or greater than a set value; an air-fuel ratio is under first feedback (F/B) control in accordance with the detection signal from the front oxygen sensor 40; the engine 2 is operated at a constant speed regime (at the regime, amounts of engine loads, such as an intake air quantity, an intake air throttle valve-opening degree, a fuel injection quantity, an intake air pressure, etc., are varied to levels equal to or less than respective set values); and, in the warm-up counter circuit 140, judgment is made that warm-up of the catalyst body 44 has been completely finished, whereby a warm-up flag (DNKFLG) is on. When the catalyst deterioration-determining conditions are fulfilled, the control means 116 determines (i.e., monitors) the deterioration of the catalyst body 44.

Figure 13:
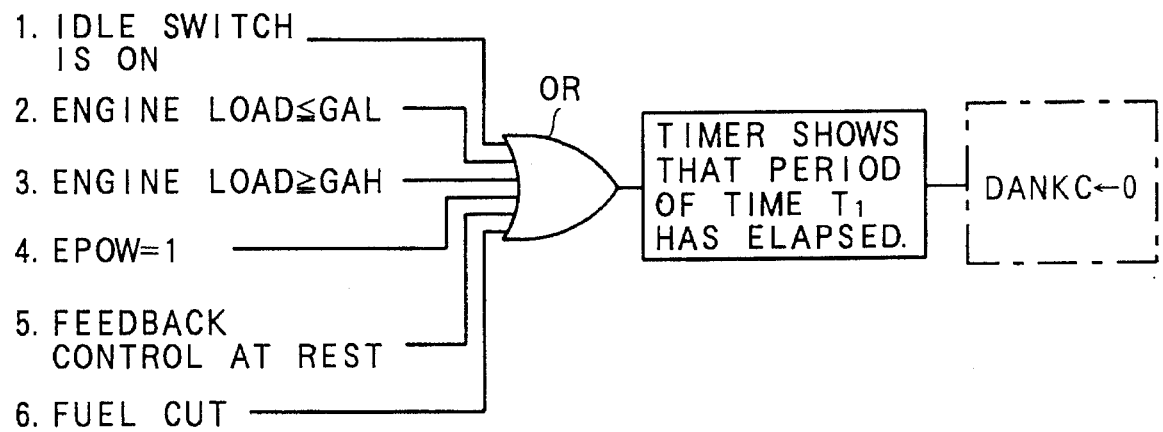
FIG. 13 is a descriptive illustration showing warm-up counter-clearing conditions.

Referring now to FIG. 13, conditions of clearing the warm-up counter (DANKC) in the warm-up counter circuit 140 are fulfilled when meeting one of the following cases in which: the internal combustion engine 2 is in a state of idle operation (this means that an idle switch is on, i.e., an opening degree of the intake air throttle valve 30 has been reduced to a preselected degree, as is detected by the throttle sensor 96); the engine load is equal to or less than a lower load value (i.e., GAL) (see FIG. 14); the engine load is equal to or greater than a higher load value (i.e., GAH) (see FIG. 14); an increase in fuel quantity during a full open stage of the intake air throttle valve 30 is under correction (FPOW), i.e., FPOW=1; first feedback (F/B) control of an air-fuel ratio in accordance with the detection signal from the front oxygen sensor 40 is out of operation; and the engine 2 is in a state of fuel cut.

Figure 14:
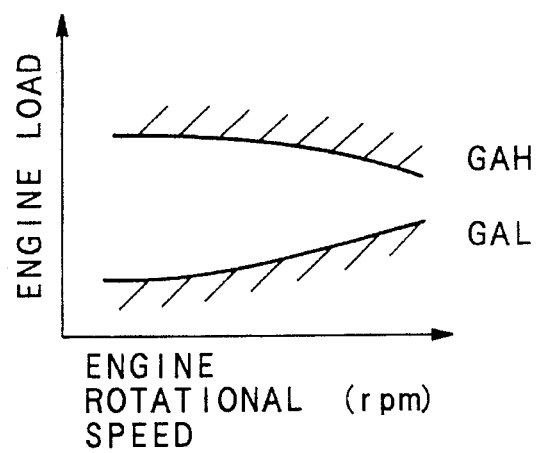
FIG. 14 is an illustration showing a relationship between an engine rotational speed and an engine load.
Figure 15:
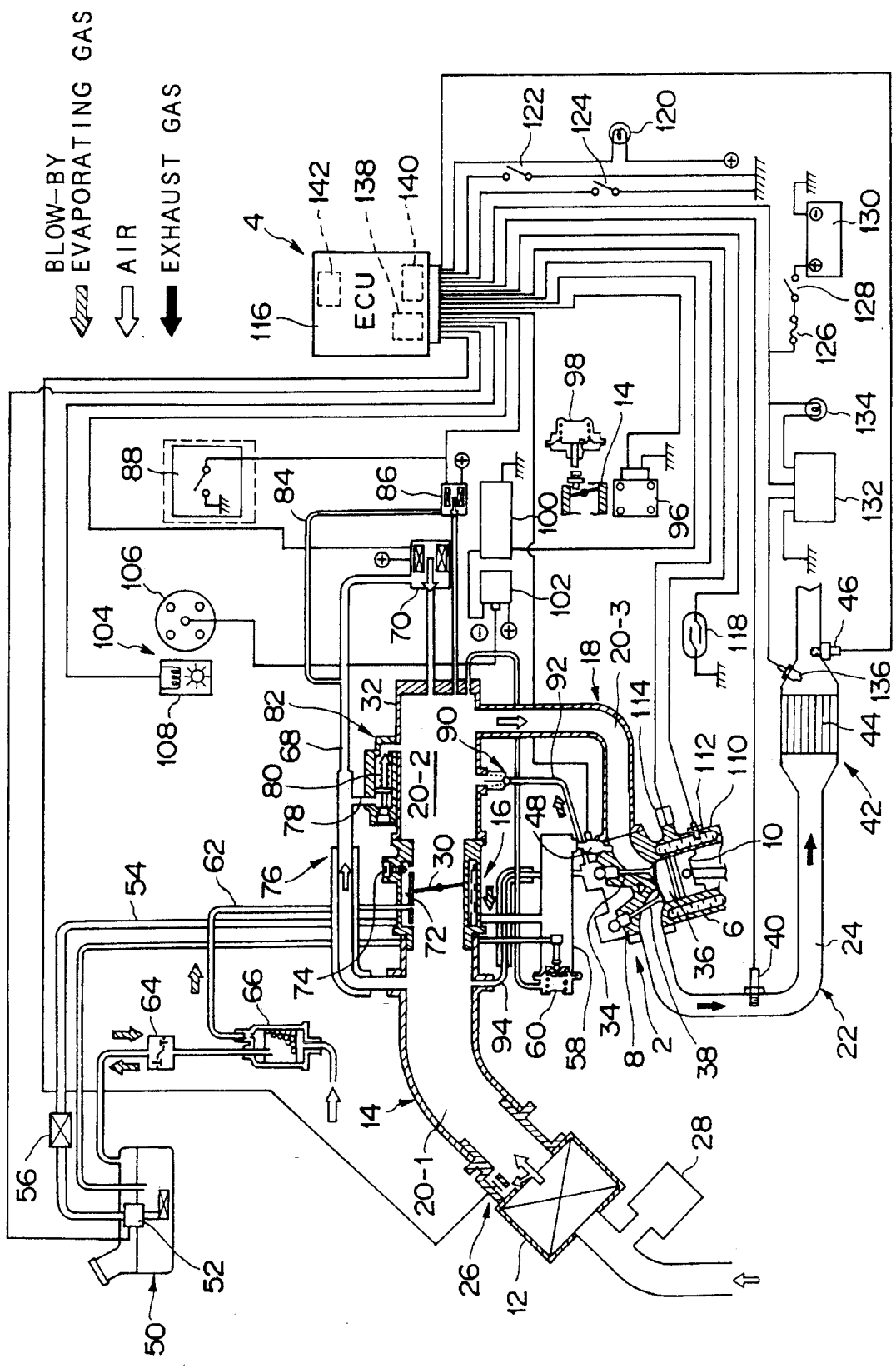
FIG. 15 is a diagram depicting a systematic construction including a catalyst deterioration-determining device.

To serve the aforesaid functions, the control means 116 incorporates the following: an AND circuit "AND" for judging whether or not the catalyst deterioration-determining (or, monitoring) conditions have been fulfilled (see FIG. 2); a map of the catalyst deterioration-determining region which is defined by the engine rotational speed and the engine load (see FIG. 3); respective relationships between time and the warm-up counter (DANKC) and between time and an air quantity (Ga), the air quantity (Ga) being regarded as one engine load (see FIG. 4); a relationship between the air quantity (Ga) and a warm-up counter set value (a count value) (DCOUNT) (see FIG. 5); a relationship between the air quantity (Ga) and an offset value (OFFSET) (see FIG. 6); a relationship between the air quantity (Ga) and a coefficient (KCOUNT) (see FIG. 7); a relationship between an intake air temperature and an intake air temperature offset value (THAOFS) (see FIG. 8); a relationship between the intake air temperature and an intake air temperature coefficient (THAKC) (see FIG. 9); a relationship between the engine rotational speed and an intake air pressure (Pb), the latter being another engine load (see FIG. 10); a relationship between the intake air temperature and a monitor start-determining value (MONST) (see FIG. 11); a relationship between the intake air temperature and a range of catalyst-determining (or, monitoring) execution (MONST-MONEND) (see FIG. 12); an OR circuit "OR" operative in response to the clearing conditions for the warm-up counter (DANKC) (see FIG. 13); and, a relationship between the engine rotational speed and the engine load (see FIG. 14).

In view of the above, in FIG. 2, the AND circuit "AND" decides to determine (or, monitor) catalyst deterioration when the previously described six states are all satisfied.

Figure 3:
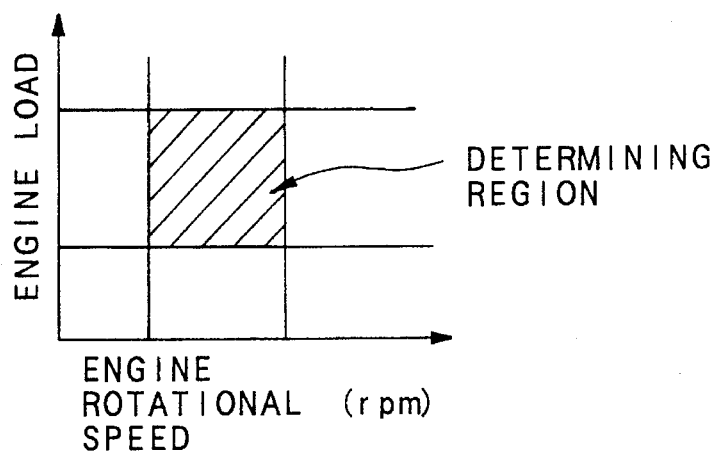
FIG. 3 is an illustration describing a determining region.

In FIG. 3, the catalyst deterioration-determining region (as designated by slanted lines) is established by the engine rotational speed (rpm) and the engine load.

In FIGS. 4 and 4A, the air quantity (Ga) by way of one engine load is defined by a determination start air value (GAST) and a determination end air value (GAEND). The latter air value (GAEND) is greater than the former air value (GAST) by a predetermined value. In addition, the warm-up counter (DANKC) has a range of catalyst deterioration-monitoring (or, determining) execution defined by a monitor end counter value (MONEND) and a monitor start counter value (MONST). The latter counter value (MONST) is greater than the former counter value (MONEND) by a predetermined value. Range I is a counter-increasing region, and range II is a counter-decreasing region.

In FIG. 5, the air quantity (Ga) determines the warm-up counter set value (count value) (DCOUNT). The warm-up counter set value (DCOUNT) is "zero" when reaching the determination start/end air values (GAST) and (GAEND) at respective points designated by air quantity values $G_1$ and $G_4$ in FIG. 5. In addition, the warm-up counter set value (DCOUNT) increases in stages in a negative (minus) value zone for a period of time between the moment the internal combustion engine 2 is started and the moment the air quantity (Ga) achieves air quantity value $G_1$ of the determination start air value (GAST). The warm-up counter set value (DCOUNT) gradually increases in a positive (plus) value zone at a range between air quantity values $G_1$ and $G_2$. The warm-up counter set value (DCOUNT) maintains a constant level in the positive value zone at a range between air quantity values $G_2$ and $G_3$. The warm-up counter set value (DCOUNT) progressively decreases in the positive value zone at a range between air quantity values $G_3$ and $G_4$ of the determination end air value (GAEND). The warm-up counter set value (DCOUNT) progressively decreases in the negative value zone at a range beyond air quantity value $G_4$. The warm-up counter (DANKC) provides a countup or countdown for each predetermined period of time $T_x$.

As a result, in the air quantity (Ga), counter-increasing region I is defined between the determination start/end air values (GAST) and (GAEND), as shown in FIG. 4. Further, counter-decreasing regions II are defined below the determination start air value (GAST) and above the determination end air value (GAEND) as well.

In addition, in order to make the count of the warm-up counter (DANKC) faster, the warm-up counter set value (DCOUNT) is subjected to initial correction until the warm-up counter (DANKC) first reaches the monitor start-determining value (MONST) after the start of the engine 2 (i.e., for a period of time between $t_0$ and $t_7$ in FIG. 4). More specifically, the initial correction is made to the warm-up counter set value (DCOUNT) for a period of time between the start of the engine 2 and the moment the warm-up counter (DANKC) first exceeds the monitor start-determining value (MONST), thereby setting a first warm-up flag (DANK-FAST) to be "1".

Figure 6:
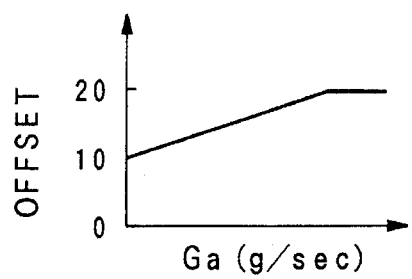
FIG. 6 is a graph showing a relationship between the air quantity and an offset value.
Figure 7:
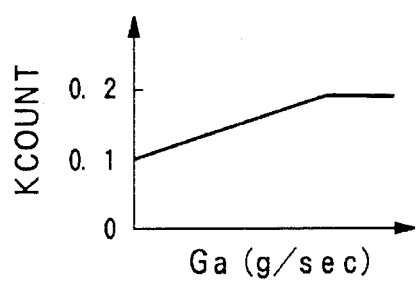
FIG. 7 is a graph showing a relationship between the air quantity and a coefficient.

There are two methods for the initial correction to the warm-up counter set value (DCOUNT). FIG. 6 illustrates a first method in which the air quantity (Ga) determines an offset value (OFFSET), and which the offset value (OFFSET) is added to the warm-up counter set value (DCOUNT). The latter step is to perform the following processing: DCOUNT+OFFSET. FIG. 7 illustrates a second method in which the air quantity (Ga) determines a coefficient (KCOUNT), and which the coefficient (KCOUNT) and the warm-up counter set value (DCOUNT) are multiplied together, i.e., the following processing is performed: DCOUNT×KCOUNT. However, these two initial correction methods may be conducted under the following condition: the determination start air value (GAST)≦the air quantity (Ga)≦the determination end air value (GAEND).

Next, the warm-up counter (DANKC) is subjected to intake air temperature correction in order to make the countup of the warm-up counter (DANKC) slower at low temperatures.

Figure 8:
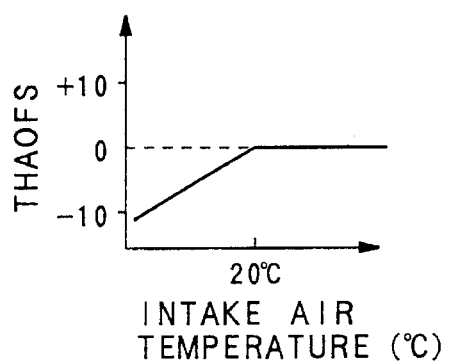
FIG. 8 is a graph showing a relationship between an intake air temperature and an intake air temperature offset value.
Figure 9:
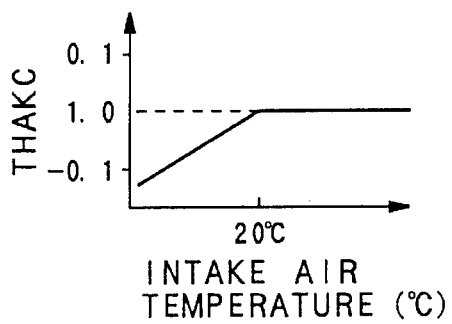
FIG. 9 is a graph showing a relationship between an intake air temperature and an intake air temperature coefficient.

There are two methods for the intake air temperature correction to the warm-up counter (DANKC). FIG. 8 illustrates a first method in which an intake air offset value (THAOFS) depends on the intake air temperature, and which the intake air offset value (THAOFS) is added to the warm-up counter value (DCOUNT), i.e., the following processing is performed: DCOUNT+THAOFS. FIG. 9 illustrates a second method in which an intake air temperature coefficient (THAKC) is dependent on the intake air temperature, and which the intake air temperature coefficient (THAKC) and the warm-up counter set value (DCOUNT) are multiplied together, i.e., the following processing is performed: DCOUNT×THAKC. The intake air temperature correction to the warm-up counter (DANKC) is made because the temperature of the catalyst body 44 rises slower at lower temperature than at ordinary temperature.

Now, referring back to FIG. 4, the warm-up counter (DANKC) provides no count before the air quantity (Ga) reaches the determination start air value (GAST) (at time $t_1$) after the internal combustion engine 2 is started (at time $t_0$). The warm-up counter (DANKC) starts counting when the air quantity (Ga) achieves the determination start air value (GAST) (at time $t_2$). When the air quantity (Ga) further increases, the warm-up counter (DANKC) provides a rapid countup until the air quantity (Ga) achieves the determination end air value (GAEND) (at time $t_3$). When the air quantity (Ga) exceeds the determination end air value (GAEND), the warm-up counter (DANKC) provides a slow countdown. When the air quantity (Ga) is returned to the determination end air value (GAEND) (at time $t_4$), the warm-up counter (DANKC) resumes a countup. The warm-up counter (DANKC) provides a rapid countup until the air quantity (Ga) achieves the determination start air value (GAST) (at time $t_5$). The warm-up counter (DANKC) provides a slow countdown while the air quantity (Ga) is less than the determination start air value (GAST) (i.e., for a period of time between $t_5$ and $t_6$). When the air quantity (Ga) reaches the determination start air value (GAST) again (at time $t_6$), the warm-up counter (DANKC) resumes a countup. The warm-up counter (DANKC) first exceeds the monitor start-determining value (MONST) (at time $t_7$) before the air quantity (Ga) reaches the determination end air value (GAEND) again (at time $t_8$). When the air quantity (Ga) is within the determination end air value (GAEND), the warm-up counter (DANKC) provides a countdown. When the air quantity (Ga) is again returned to the determination end air value (GAEND) (at time $t_9$), the warm-up counter (DANKC) resumes a countup which is greater than the monitor start-determining value (MONST). The warm-up counter (DANKC) continues to countup until the air quantity (Ga) is reduced to the determination start air value (GAST) (at time $t_{10}$). When the air quantity (Ga) is less than the determination start air value (GAST), the warm-up counter (DANKC) counts down to the monitor end-determining value (MONEND) (at time $t_{12}$) through the monitor start-determining value (MONST) (at time $t_{11}$).

In short, as illustrated in FIG. 4, the air quantity (Ga) distinguishes the countup and countdown of the warm-up counter (DANKC). In addition, the deterioration of the catalyst body 44 is determined (or, monitored) for a period of time from the moment the warm-up counter (DANKC) at first reaches the monitor start-determining value (MONST) until the warm-up counter (DANKC) achieves the monitor end-determining value (MONEND). That is, the deterioration of the catalyst body 44 is determined (or, monitored) for a period of time between $t_7$ and $t_{12}$ or alternatively, between $t_{11}$ and $t_{12}$.

Figure 10:
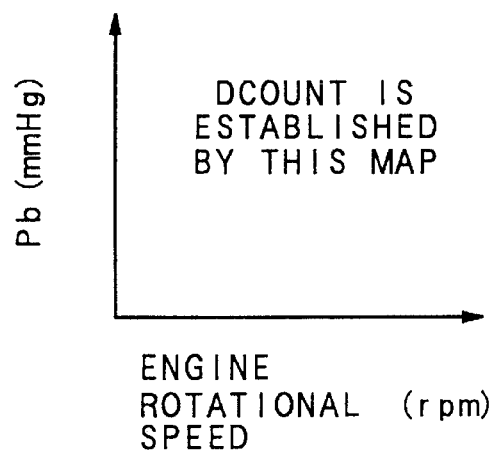
FIG. 10 is a graph showing a relationship between an engine rotational speed and an intake air pressure.

The warm-up counter set value (DCOUNT) of FIG. 5 is established by the air quantity (Ga). However, as shown in FIG. 10, the warm-up counter set value (DCOUNT) may be defined individually by either intake air pressure (Pb) or fuel injection quantity, whatever can simulate any engine load of the internal combustion engine 2. Alternatively, the warm-up counter set value (DCOUNT) may be decided by a specified value from a two-dimensional map. The map is defined by the engine rotational speed and either intake air pressure or fuel injection quantity.

Figure 11:
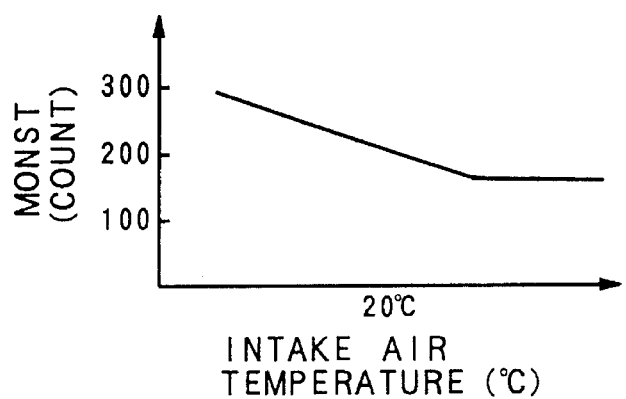
FIG. 11 is a graph showing a relationship between the intake air temperature and a monitor start-determining value.

In FIG. 11, the monitor start-determining value (MONST) of FIG. 4 is varied with the intake air temperature. In addition, the monitor start-determining value (MONST) is set to delay the start of determining (or, monitoring) catalyst deterioration at reduced temperatures, as compared with the start at ordinary temperatures.

Figure 12:
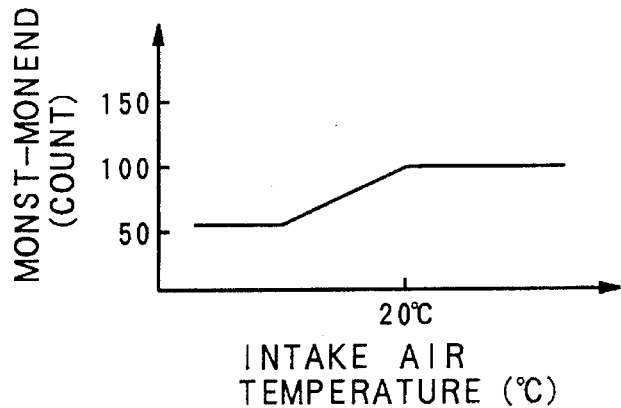
FIG. 12 is a graph showing a relationship between the intake air temperature and a range of catalyst deterioration-determining execution.

In FIG. 12, the range of catalyst deterioration-monitoring execution (MONST-MONEND) of FIG. 4 is varied with the intake air temperature because the temperature of the catalyst material 44 rapidly falls at low temperatures.

In FIG. 13, the OR circuit "OR" clears the warm-up counter (DANKC) even if one of the previously described six states is fulfilled. To be specific, the warm-up counter (DANKC) is rendered "zero" when the timer 142 shows that one of the preceding six states is retained for a period of time $T_1$. Alternatively, instead of clearing the warm-up counter (DANKC), subtractive values in the warm-up counter set value (DCOUNT) may be set to be larger in order to increase the speed of a subtractive operation of the warm-up counter (DANKC).

In FIG. 14, with respect to the clearing conditions for the warm-up counter (DANKC), the lower load value (GAL) and the higher load value (GAH) are established by the engine rotational speed.

Next, the operation of the present embodiment will be described with reference to the flow chart of FIG. 1.

When an internal combustion engine 2 is started, a catalyst deterioration-determining program in a control means 116 starts with step 202. Then, this program routine is advanced to step 204 at which the following processing is initially performed: DANKFAST, DANKC←0; and, DANKFLG←0. That is, the DANKFAST and warm-up counter DANKC are "zero" when a warm-up flag (DNK-FLG) has never been on after the internal combustion engine is started.

At subsequent step 206, predetermined catalyst deterioration-determining (or, monitoring) conditions are read. At next step 208, determination is made as to whether the catalyst deterioration-determining conditions have been fulfilled.

As illustrated in FIG. 2, it is determined at this stage whether or not the catalyst deterioration-determining conditions met all of the following: deterioration as to catalyst degradation is limited to within a catalyst deterioration-determining region (designated by slanted lines in FIG. 3), which is established by an engine load and an engine rotational speed; warm-up of the internal combustion engine 2 has been terminated; an intake air temperature is equal to or greater than a set value (the intake air temperature≧the set value); an air-fuel ratio is under first feedback (F/B) control in accordance with the detection signal from the front oxygen sensor 40; and the engine 2 is operated at a constant speed regime (at the regime, amounts of engine loads, such as an intake air quantity, an intake air throttle valve-opening degree, a fuel injection quantity, an intake air pressure, etc., are varied to levels equal to or less than respective set values).

When the determination in step 208 is "NO", this routine is returned to step 206.

When the determination in step 208 is "YES", it is determined at step 210 whether or not DANKFAST=0 is true.

When the determination in step 210 is "YES" the routine is advanced to step 212 at which determination is made as to whether the air quantity (Ga) holds true of: the determination start air value (GAST≦the air quantity (Ga)≦the determination end air value (GAEND), as shown in FIGS. 4 and 4A.

When the determination in step 212 is "YES", the routine is advanced to step 214 at which initial correction is made to the warm-up counter set value (DCOUNT), as shown in FIG. 5 through FIG. 7. That is, the following processing is performed: either DCOUNT+OFFSET or DCOUNT× KCOUNT.

At next step 216, intake air temperature correction is made to the warm-up counter set value (DCOUNT), as shown in FIGS. 8 and 9. That is, the following processing is conducted: either DCOUNT+THAOFS or DCOUNT× THAKC.

When the respective determinations in steps 210 and 212 are "NO", the routine is immediately shifted to the aforesaid step 216.

At next step 218, the warm-up counter (DANKC) is started. This means that the warm-up counter (DANKC) reckons, as illustrated in FIG. 5. Then the following processing is performed: DANKC←DANKCold+DCOUNT. A timer is operated for each time $T_x$, thereby causing the warm-up counter (DANKC) to provide either a countup or countdown.

The routine is then advanced to step 220 at which it is determined whether or not DANKFAST=0 is true.

When the determination in step 220 is "YES", the routine is advanced to step 222 at which it is determined whether or not DANKC≧MONST is true.

When the determination in step 222 is "NO" the routine is returned to step 206.

However, when the determination in step 222 is "YES", the following processing is performed at next step 224: DANKFAST←1.

At subsequent step 226, it is determined whether or not DANKC≧MONEND is true. In addition, when the determination in step 220 is "NO", the routine is immediately shifted to this step 226.

When the determination in step 226 is "YES", the routine is advanced to step 228 at which the following processing is effected: the warm-up flag (DNKFLG)←1, i.e., the warm-up flag (DNKFLG) is on. Determination (or, monitoring) is thereby made to catalyst deterioration.

When the determination in step 226 is "NO", the routine is shifted to step 230 at which the following processing is effected: warm-up flag (DNKFLG)←0, i.e., the warm-up flag (DNKFLG) is off. This processing stops catalyst deterioration from being determined (or, monitored).

The routine is returned to step 206 after the respective processing in steps 228 and 230 is terminated.

As shown in FIG. 10, the countup and countdown of the warm-up counter (DANKC) are established not exclusively by the air quantity (Ga), but may be defined individually by, e.g., either intake air pressure or fuel injection quantity, whatever can stimulate any engine load of the internal combustion engine 2. Alternatively, the countup and countdown of the warm-up counter (DANKC) may be determined by a specified value from a two-dimensional map. The map is defined by the engine rotational speed and either intake air pressure or fuel injection quantity.

Further, as shown in FIG. 11, the monitor start-determining value (MONST) is varied with the intake air temperature.

Moreover, as can be seen from FIG. 12, the range of catalyst deterioration-monitoring execution (MONST-MONEND), which is shown in FIG. 4, is varied with the intake air temperature.

As illustrated in FIG. 13, the clearing conditions for the warm-up counter (DANKC) is fulfilled when meeting one of the previously mentioned first-to-sixth cases. To be specific, the first case is that an idle switch is on, i.e., an opening degree of the intake air throttle valve 30 has been reduced to a preselected degree, as is detected by the throttle sensor 96. The second case is that the engine load is equal to or less than a lower load value (i.e., GAL). The third case is that the engine load is equal to or greater than a higher load value (i.e., GAH). The fourth case is that FPOW=1, i.e., an increase in fuel quantity during a full open stage of the intake air throttle valve 30 is under correction. The fifth case is that an air-fuel ratio is stopped from being feedback-controlled in accordance with the detection signal from the front oxygen sensor 40. The sixth case is that the engine 2 is in a state of fuel cut. When the timer 142 shows that one of the aforesaid states continues for a period of time $T_1$, the following processing is performed: the warm-up counter (DANKC)←0. As shown in FIG. 14, the lower load value (GAL) and the higher load value (GAH) are established by the engine rotational speed (rpm).

Alternatively, instead of clearing the warm-up counter (DANKC), subtractive values in the warm-up counter set value (DCOUNT) may be set to be large so as to increase the speed of a subtractive operation of the warm-up counter (DANKC).

As a result, a warm-up state and an oxygen storage state of the catalyst body 44 can be simulated and judged by the warm-up counter (DANKC) without the use of a temperature sensor for detecting the temperature of the catalyst body 44. In addition, a simple, low cost structure is provided.

Furthermore, since a temperature state of the catalyst body 44 found from the temperature sensor is excluded from deterioration-determining conditions for the catalyst body 44, accurate determination can be made as to whether the catalyst body 44 has been degraded. This feature provides both enhanced reliability of vehicles and increased accuracy in determining the deterioration of the catalyst body 44.

Moreover, when the temperature of the catalyst body 44 under the influence of low temperatures and/or a strong wind is reduced to a level incapable of determining the deterioration of the catalyst body 44, the catalyst deterioration-determining conditions are viewed as not being fulfilled despite the catalyst body 44 being normally operative. Therefore, the determination is stopped from being made to the deterioration of the catalyst body 44. This step eliminates the chance that the catalyst body 44 in a normal state might be judged as abnormal. That is, no misjudgment is made as to the degradation of the catalyst body 44. As a result, meaningless replacement or repair of parts can be eliminated.

As evidence by the above detailed description, according to the present invention, there is provided a control means which determines, on the basis of a warm-up counter, whether or not a catalyst body is in a predetermined warm-up state. The warm-up counter is used for the catalyst body, and provides a count in relation to any engine load of an internal combustion engine. Assuming that the catalyst body is found to be in the predetermined warm-up state according to the above determination, the control means judges whether or not deterioration-determining conditions for the catalyst body have been fulfilled. As a result, a warm-up state and an oxygen storage state of the catalyst body can be simulated and judged without the use of a temperature sensor. Accordingly, there is no need for the temperature sensor, and a simple, low cost structure is provided.

In addition, since a temperature state of the catalyst body known from the temperature sensor is ignored from the deterioration-determining conditions for the catalyst body, accurate determination can be made as to whether the catalyst body has been degraded. As a consequence, improvements are achievable in both the reliability of vehicles and the accuracy of judgment on the deterioration of the catalyst body.

Furthermore, when the temperature of the catalyst body under the influence of low temperatures and/or a strong wind is lowered to a level incapable of determining the deterioration of the catalyst body, the catalyst deterioration-determining conditions are identified as not being fulfilled in spite of the catalyst body being in normal operation. Therefore, the deterioration-determining device is stopped from determining the deterioration of the catalyst body. As a result, there is no likelihood that the catalyst body in a normal state might be judged as abnormal. This means that such a misjudgment on the degradation of the catalyst body will never be made, which consequently obviates the need for worthless replacement or repair of parts.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In a catalyst deterioration-determining device for an internal combustion engine, having first and second exhaust sensors disposed in an exhaust passage of said internal combustion engine respectively on upstream and downstream sides of a catalyst body, said catalyst body being placed generally midway along said exhaust passage, said catalyst deterioration-determining device effecting feedback control of an air-fuel ratio in response to respective detection signals from said first and second exhaust sensors, and simultaneously determining deterioration of said catalyst body when predetermined catalyst deterioration-determining conditions are fulfilled, the improvement comprising: a control means for judging, on the basis of a warm-up counter used for said catalyst body, whether or not said catalyst body is in a predetermined warm-up state, said warm-up counter counting in relation to any engine load of said internal combustion engine, wherein when said catalyst body is found to be in said predetermined warm-up state according to the above judgment, said control means determines whether or not deterioration-determining conditions for said catalyst body have been fulfilled.

2. A catalyst deterioration-determining device according to claim 1, wherein, after said internal combustion engine is started, said control means drives said warm-up counter to start reckoning in relation to any engine load of said internal combustion engine, whereby said control means judges that said catalyst body is in a predetermined warm-up state when counts registered by said warm-up counter fall within a range of catalyst deterioration-determining execution, and wherein said control means determines the degradation of said catalyst body in the event that said catalyst body is known by the above judgment to be in said predetermined warm-up state, and that other catalyst deterioration-determining conditions are all satisfied.

\* \* \* \* \*

UNITED STATES PATENT AND TRADEMARK OFFICE
CERTIFICATE OF CORRECTION

PATENT NO. : 5 531 069
DATED : July 2, 1996
INVENTOR(S) : Katsuhiko Toyoda

It is certified that error appears in the above-indentified patent and that said Letters Patent is hereby corrected as shown below: Title page, On title page, line 2; change "Katsuhiko" to
---Toyoda---.

On the title page, please change [75] Inventor to the following:

---[75] Inventor: Katsuhiko Toyoda,
Shizuoka-ken, Japan---.

Signed and Sealed this

Nineteenth Day of November, 1996

Attest:

BRUCE LEHMAN

Attesting Officer

Commissioner of Patents and Trademarks